United States Patent
Durand-Gasselin et al.

(10) Patent No.: US 12,005,741 B2
(45) Date of Patent: Jun. 11, 2024

(54) PNEUMATIC TIRE WITH IMPROVED TREAD

(71) Applicant: COMPAGNIE GENERALE DES ETABLISSEMENTS MICHELIN, Clermont-Ferrand (FR)

(72) Inventors: Benoit Durand-Gasselin, Clermont-Ferrand (FR); Fabien Hellot, Clermont-Ferrand (FR); Marie-Laure Francois, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 186 days.

(21) Appl. No.: 17/782,267

(22) PCT Filed: Dec. 3, 2020

(86) PCT No.: PCT/FR2020/052270
§ 371 (c)(1),
(2) Date: Jun. 3, 2022

(87) PCT Pub. No.: WO2021/111083
PCT Pub. Date: Jun. 10, 2021

(65) Prior Publication Data
US 2022/0388344 A1  Dec. 8, 2022

(30) Foreign Application Priority Data

Dec. 4, 2019 (FR) ...................................... 1913722

(51) Int. Cl.
*B60C 11/00* (2006.01)
*B60C 11/24* (2006.01)
*B60C 19/08* (2006.01)

(52) U.S. Cl.
CPC ...... *B60C 11/0075* (2013.01); *B60C 11/0008* (2013.01); *B60C 11/24* (2013.01);
(Continued)

(58) Field of Classification Search
CPC . B60C 11/00; B60C 11/0075; B60C 11/0008; B60C 2011/0025; B60C 2011/0016
See application file for complete search history.

(56) References Cited

U.S. PATENT DOCUMENTS 9,919,565 B2  3/2018  Bourgeois et al.
10,160,847 B2  12/2018  Lesage et al.
(Continued)

FOREIGN PATENT DOCUMENTS

EP  2311655 A1  4/2011
EP  3208110 A1  8/2017
(Continued)

OTHER PUBLICATIONS

International Search Report dated Feb. 3, 2021, in corresponding PCT/FR2020/052270 (4 pages).

*Primary Examiner* — Cedrick S Williams
(74) *Attorney, Agent, or Firm* — VENABLE LLP

(57) ABSTRACT

A tire for a vehicle comprises a tread (2), of which the central part of the tread (2) comprises at least two rubber compounds (221, 222), making up at least 90% of its volume. The first compound (221) is radially on the outside of the second compound (222) and makes up at least 40% and at most 60% of the volume of the central part. The second rubber compound (222) has a Shore hardness DS2 at least equal to 5 plus the Shore hardness DS1 of the first compound (221) and dynamic losses at a temperature of 0° C. and 23° C. that are at least equal to those of the first rubber compound (221). The axially outer parts of the tread are made up of a third compound (223) capable of touching (Continued)

the ground, having a stiffness and a hysteresis that are lower than those of the first compound.

14 Claims, 1 Drawing Sheet

(52) U.S. Cl.
CPC .... B60C 19/082 (2013.01); *B60C 2011/0016* (2013.01); *B60C 2200/04* (2013.01)

(56) References Cited

U.S. PATENT DOCUMENTS

| | | | |
|---|---|---|---|
| 11,124,634 B2 | 9/2021 | Francois et al. | |
| 2011/0048600 A1* | 3/2011 | Yogou | B60C 11/00 152/209.5 |
| 2013/0267640 A1 | 10/2013 | Lopez et al. | |
| 2013/0274404 A1 | 10/2013 | Vasseur et al. | |
| 2013/0296471 A1 | 11/2013 | Lesage et al. | |
| 2016/0214437 A1 | 7/2016 | Bourgeois et al. | |
| 2020/0123351 A1 | 4/2020 | Francois et al. | |
| 2021/0031565 A1 | 2/2021 | Prost et al. | |
| 2023/0191851 A1 | 6/2023 | Durand-Gasselin et al. | |

FOREIGN PATENT DOCUMENTS

| | | |
|---|---|---|
| JP | 61-160303 A | 7/1986 |
| WO | 2012/069565 A1 | 5/2012 |
| WO | 2012/069567 A1 | 5/2012 |
| WO | 2012/069585 A1 | 5/2012 |
| WO | 2015/032601 A1 | 3/2015 |
| WO | 2018/002487 A1 | 1/2018 |
| WO | 2018/115722 A1 | 6/2018 |
| WO | 2019/145621 A1 | 8/2019 |

* cited by examiner

PNEUMATIC TIRE WITH IMPROVED TREAD

BACKGROUND

The present invention relates to a tyre for a passenger vehicle, and more particularly to the tread of such a tyre.

Since a tyre has a geometry exhibiting symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively.

In the following text, the expressions "radially on the inside of" and "radially on the outside of" mean "closer to the axis of rotation of the tyre, in the radial direction, than" and "further away from the axis of rotation of the tyre, in the radial direction, than", respectively. The expressions "axially on the inside of" and "axially on the outside of" mean "closer to the equatorial plane, in the axial direction, than" and "further away from the equatorial plane, in the axial direction, than", respectively. The equatorial plane is the circumferential plane, perpendicular to the axis of rotation, passing through the middle of the tread.

A "radial distance" is a distance with respect to the axis of rotation of the tyre and an "axial distance" is a distance with respect to the equatorial plane of the tyre. A "radial thickness" is measured in the radial direction and an "axial width" is measured in the axial direction.

A tyre comprises a crown comprising a tread that is intended to come into contact with the ground via a tread surface, at least one crown reinforcement radially on the inside of the tread. The tyre also comprises two beads that are intended to come into contact with a rim, and two sidewalls that connect the crown to the beads. Furthermore, a tyre comprises a carcass reinforcement comprising at least one carcass layer that is radially on the inside of the crown and connects the two beads.

The tread is therefore constituted by the one or more rubber compounds radially on the outside of the radially outermost layer of reinforcing elements of the crown reinforcement, excluding the rubber compounds coating the reinforcing elements of said crown layer.

The tread does not comprise the rubber compounds disposed on each sidewall of the tyre, a portion of which could be radially on the outside and axially on the outside of the crown reinforcement. Sidewall compounds that have very specific compositions, in particular for resisting ultraviolet, are excluded from the surfaces and volumes of the tread. A rubber compound of the tyre of which more than 30% of the surface on a meridian section is radially on the inside of the radially innermost crown layer is not a compound of the tread but a sidewall compound.

The expression "rubber compound" denotes a composition of rubber comprising at least an elastomer and a filler.

The tread of the tyres considered by the invention comprises cuts that correspond to the space delimited by walls of material that face each other and are spaced apart from one another by a non-zero distance and connected by a bottom surface. The tread pattern height is the maximum radial distance between the radially innermost points of the bottom surfaces and the tread surface. These cuts are essential for the performance in terms of grip on wet ground and in particular aquaplaning. The overpressures on the ground that the cuts generate at the interface between the tread surface and said walls make it possible to break the film of water that is present on the ground on which the tyre is running in order to bring into contact said ground and the rubber compound of the tread. The cuts also constitute a voids volume that makes it possible to store the water present on the ground and displaced by the tread surface being brought into contact with the ground on which the tyre is running. This storage capacity is crucial for the aquaplaning performance.

The performance of tyres changes with their wear. As the tread pattern height decreases with wear, the performance of the tyre changes, the rolling resistance decreases because the deformed thickness of rubber compounds is reduced, the stiffness of the tread pattern increases and the water storage capacity decreases and as a result the aquaplaning performance decreases.

In order to improve the performance in terms of grip on wet ground and in particular aquaplaning for a worn tyre even further, one solution is to use a rubber compound with high hysteresis at 0° C. for the tread in the new state. However, this solution greatly degrades the rolling resistance because the rubber compound that has such properties at 0° C. also has a high hysteresis at 23° C., this characteristic primarily controlling the rolling resistance.

This objective is achieved in the prior art by using complex tread patterns that recreate cuts as the tyre becomes more worn (EP 2311655 A1, JPS61 160303). These solutions entail the manufacture of tyre moulds that are complex, expensive, complicated to demould and sensitive to the chunking of rubbers.

Other tyres are described in EP3208110, WO 2015/032601, WO 2018/002487 and WO 2019/145621.

The objective of the invention is to ensure very good grip on wet ground at the end of life of a tyre without degrading the rolling resistance.

SUMMARY

This objective is achieved by a passenger vehicle tyre comprising:
 a tread that is intended to come into contact with the ground via a tread surface, two beads that are intended to come into contact with a rim, and two sidewalls that connect the crown to the beads,
 the tread being radially on the outside of a crown reinforcement, said crown reinforcement comprising at least one crown layer comprising reinforcing elements,
 the tread having a central part and two axially outer parts, the central part having an axial width equal to 90% of the axial width L of the tread,
 the tread comprising at least three rubber compounds, called first, second and third rubber compounds,
 the central part of the tread comprising at least the first and second rubber compounds, these two rubber compounds making up at least 90% of the volume of the central part of the tread,
 in the central part of the tread, the first rubber compound being radially on the outside of the second rubber compound and the first rubber compound making up at least 40% and at most 60% of the volume of the central part of the tread,
 the first and third rubber compounds making up at least 90% of the volume of the axially outer parts of the tread, the third rubber compound being axially on the outside of the first rubber compound and making up at least 40% of the volume of the axially outer parts,
 the second rubber compound having a Shore hardness DS2 at least equal to 5 plus the Shore hardness DS1 of the first rubber compound, the Shore hardness DS3 of the third rubber compound being at most equal to the Shore hardness DS1 of the first rubber compound, each Shore hardness DS1, DS2, DS3 being measured at 23° C. according to standard ASTM 2240-15e1, the second rubber compound having a secant tensile modulus MA300_2 at 300% deformation, measured at 23° C. according to standard ASTM D 412-16, at least equal to 0.75 times the secant tensile modulus MA300_1 at 300% deformation of the first rubber compound and at most equal to 1.25 times the secant tensile modulus MA300_1 at 300% deformation of the first rubber compound, and the third rubber compound having a secant tensile modulus MA300_3 at 300% deformation, measured at 23° C. according to standard ASTM D 412-16, at least equal to 0.9 times the secant tensile modulus MA300_1 at 300% deformation of the first rubber compound and at most equal to 1.3 times the secant tensile modulus MA300_1 at 300% deformation of the first rubber compound, the second rubber compound having a dynamic loss tan D0_2, measured according to standard ASTM D 5992-96, at a temperature of 0° C. at 10 Hz, at least equal to the dynamic loss tan D0_1 of the first rubber compound, measured according to standard ASTM D 5992-96, at a temperature of 0° C. at 10 Hz, and the third rubber compound having a dynamic loss tan D0_3, measured according to standard ASTM D 5992-96, at a temperature of 0° C. at 10 Hz, at most equal to 70% of the dynamic loss tan D0_1 of the first rubber compound, measured according to standard ASTM D 5992-96, at a temperature of 0° C. at 10 Hz, the dynamic loss tan D23_1 of the first rubber compound, measured according to standard ASTM D 5992-96, at a temperature of 23° C. at 10 Hz, being at most equal to the dynamic loss tan D23_2 of the second rubber compound, measured according to standard ASTM D 5992-96, at a temperature of 23° C. at 10 Hz and the dynamic loss tan D23_3 of the third rubber compound, measured according to standard ASTM D 5992-96, at a temperature of 23° C. at 10 Hz, being at most equal to 70% of the dynamic loss tan D23_1 of the first rubber compound, measured according to standard ASTM D 5992-96, at a temperature of 23° C. at 10 Hz.

The invention consists of the original use of a tread comprising essentially three rubber compounds. The first and second rubber compounds constitute 90% of the volume of the central part of the tread and are designed in terms of performance to come into contact with the ground and provide very good grip, the first in new condition and according to the embodiment of the invention in the worn state and the second after wear of at least part of the second rubber compound. Combined with these two rubber compounds of the central part designed for their grip performance, a third rubber compound is placed on the outer parts of the tread able to be in contact with the ground and close in wear performance to the first and second rubber compounds but with the hysteresis reduced in order to compensate for the increase in the hysteresis of the other two rubber compounds.

Combined with these three rubber compounds, the tread may comprise, for example, either:
a layer of small radial thickness, less than 0.4 mm, situated between the rubber compound coating the radially outermost layer of reinforcing elements of the crown reinforcement and the radially innermost interface of the tread in order to provide the connection between these two elements,
a strip, of small axial width of less than 10 mm, of rubber compound, which is electrically conductive, forming the link between the ground on which the tyre is running and the reinforcing elements of the crown, in order to allow the tyre to satisfy the electrical conductivity standards.

The first and second rubber compounds representing 90% of the volume of the central part are disposed radially, the first being radially on the outside of the second. Since both of the rubber compounds possess properties, in particular mechanical properties, compatible with running on the ground on which the tyre is running, they have wear potentials that are close to one another. The wear potential is expressed in particular by the secant tensile modulus MA300 at 300% deformation, measured at 23° C. according to standard ASTM D 412-16-16. Unlike well-known arrangements for improving the rolling resistance, the second rubber compound is not a soft material of very low hysteresis and very low wear potential. The second rubber compound is stiff and hysteric. Likewise, having a first rubber compound that wears excessively compared with the second rubber compound would excessively reduce the period of use during which the tread pattern height allows good grip on wet ground. Thus, the second rubber compound has a secant tensile modulus MA300_2 at 300% deformation, measured at 23° C. according to standard ASTM D 412-16, at least equal to 0.75 times the secant tensile modulus MA300_1 at 300% deformation of the first rubber compound and at most equal to 1.25 times the secant tensile modulus MA300_1 at 300% deformation of the first rubber compound.

The respective volumes of the various volumes of the rubber compounds are evaluated by considering the surface areas that they occupy on a meridian section of the tyre by considering the toroidal geometry of the tyre in order to evaluate the volume.

Having two rubber compounds with similar secant tensile moduli MA300 at 300% deformation allows more regular and homogeneous wear and thus makes it possible to avoid irregular forms of wear. Thus, preferably, the second rubber compound has a secant tensile modulus MA300_2 at 300% deformation, measured at 23° C. according to standard ASTM D 412-16, at least equal to 0.9 times the secant tensile modulus MA300_1 at 300% deformation of the first rubber compound and at most equal to 1.1 times the secant tensile modulus MA300_1 at 300% deformation of the first rubber compound.

To achieve the desired wet grip performance at the end of tread wear, and preferably without resorting to a complex tread pattern if use does not already require it, as for winter tyres, and to compensate for the reduction in the tread pattern height, it is necessary for the second rubber compound to have a better grip performance than the first rubber compound. Thus, the second rubber compound has a dynamic loss tan D0_2, measured according to standard ASTM D 5992-96, at a temperature of 0° C. at 10 Hz, at least equal to the dynamic loss tan D0_1 of the first rubber compound, measured according to standard ASTM D 5992-96, at a temperature of 0° C. at 10 Hz. In order to achieve the level of grip targeted by the invention, the dynamic losses tan D0_1 and tan D0_2, measured according to standard ASTM D 5992-96, at a temperature of 0° C. at 10 Hz, are preferably at least equal to 0.7.

In order to achieve such a level of dynamic loss tan D0, measured according to standard ASTM D 5992-96, at a temperature of 0° C. at 10 Hz, said first and second rubber compounds comprise a silica filler at a content at least equal to 100 parts per hundred of elastomer.

In order to avoid disproportionate variations in grip during the service life of the tyre, the second rubber compound has a dynamic loss tan D0_2, measured according to standard ASTM D 5992-96, at a temperature of 0° C. at 10 Hz, at most equal to 1.2 times the dynamic loss tan D0_1 of the first rubber compound, measured according to standard ASTM D 5992-96, at a temperature of 0° C. at 10 Hz.

In order for the invention to work, it is moreover necessary to create a synergy between the position of the rubber compounds in the tread, their stiffnesses and their hystereses. In order to limit rolling resistance and improve grip, the idea is to increase the stiffness of the material in order to limit the deformations creating energy dissipation but also to combat the phenomenon of blistering that occurs with the decrease in tread pattern height that is associated with wear.

A phenomenon well known to those skilled in the art, at high speed, is the phenomenon of aquaplaning. With speed, the amount of water to be evacuated per second in the contact patch increases. As the voids ratio of the tread pattern is constant, there is a speed at which the amount of water fills all of the voids. By further increasing the speed, the water can no longer be evacuated and a water front forms at the front of the tyre that creates an overpressure in the contact patch. Under the effect of this pressure, the surface area of the contact patch tends to decrease, until it is no longer sufficient to ensure the grip of the vehicle, causing aquaplaning.

Studying this phenomenon shows that a major parameter of aquaplaning is the voids ratio of the tread. More detailed study shows that the deformation of the one or more rubber compounds of the tread also affects this performance. When the water pressure increases, depending on the stiffness of the rubber compounds a blistering phenomenon does or does not occur, with a loss of contact of part of the contact patch in which contact is made with the ground on which the tyre is running. This phenomenon would also be present for reduced speeds and it would make it possible to couple the phenomena of grip and stiffness of the rubbers and also of rolling resistance. Specifically, the rolling resistance depends on the hysteresis of the rubber compounds of the tread but also on their deformations and therefore on their stiffnesses.

With wear of the tread, the voids volume decreases and influences the grip. The evacuation of the water in the contact patch takes place at a higher pressure. This synergy of the phenomena of stiffness and grip would therefore be all the more effective when the tread pattern height is low. Furthermore, the increase in stiffness would make it possible to limit the rolling resistance by limiting the deformation. Surprisingly, this reasoning based on phenomena that are of secondary importance to the targeted performance aspects, grip and rolling resistance, would work as long as the invention is carried out with materials of the tread that operate over the ranges of hysteresis and stiffness descriptors that effectively generate a synergy, which are according to the invention.

Regarding stiffness, it is essential that the second rubber compound has a Shore hardness DS2 at least equal to 5 plus the Shore hardness DS1 of the first rubber compound, but preferably at most equal to 10 plus the Shore hardness DS1 of the first rubber compound so as to avoid problems of irregular wear.

Regarding the hysteresis of the rubber compounds of the tread, it is essential that the dynamic loss tan D23_1, measured according to standard ASTM D 5992-96, at a temperature of 23° C. at 10 Hz, is at most equal to the dynamic loss tan D23_2, measured according to standard ASTM D 5992-96, at a temperature of 23° C. at 10 Hz. Preferably, so as to improve the rolling resistance even further, it is advantageous that the dynamic loss tan D23_1, measured according to standard ASTM D 5992-96, at a temperature of 23° C. at 10 Hz, is at most equal to 0.8 times the dynamic loss tan D23_2, measured according to standard ASTM D 5992-96, at a temperature of 23° C. at 10 Hz. Since the first rubber compound is the radially outermost, it therefore deforms the most. For adequate rolling resistance performance, it should be the least hysteretic at 23° C.

The synergy obtained in the central part of the tread allows an improvement in grip, wear, behaviour and aquaplaning performances but degrades the rolling resistance performance. To avoid this degradation, the idea is to introduce a third material into the tread at the level of the axially outer parts of the tread, taking into account the specific nature of this zone.

The third material only comes into contact with the ground during particularly high stresses in terms of load and transverse force. The axially outer parts of the tread are subjected to much greater flattening deformations than the central part, because these parts are doubly curved, longitudinally and axially. Therefore, adding the second rubber material would lead to a very significant degradation of the rolling resistance and the first rubber compound is of little relevance in terms of the need for grip on this relatively unstressed zone. The idea is to place in these axially outer parts of the tread, a material that is sufficiently stiff to be in contact with the ground near the first rubber compound but with a hysteresis at 23° C. that is sufficiently low to compensate for, in terms of rolling resistance, the introduction of the second rubber compound.

The first and third rubber compounds must therefore make up by volume at least 90% of the axially outer parts of the tread, the third rubber compound being axially on the outside of the first rubber compound, that is to say in the zones of greater deformations to reduce rolling resistance. The third rubber compound comprises at least 40%, preferentially 75%, preferentially 90%, of the volume of the axially outer parts in order to bring about a maximum improvement in rolling resistance.

It is possible to have solutions for distribution of the first and third rubber compounds in the axially outer parts of the tread, where, at the same axial coordinate, the two rubber compounds are present. In this case, given the better grip properties of the first rubber compound, a preferred solution is for the third rubber compound of the tread to be radially inside the first rubber compound.

To significantly reduce the rolling resistance, it is essential for the dynamic loss tan D23_3 of the third rubber compound, measured according to standard ASTM D 5992-96, at a temperature of 23° C. at 10 Hz, to be at most equal to 70% of the dynamic loss tan D23_1 of the first rubber compound, measured according to standard ASTM D 5992-96, at a temperature of 23° C. at 10 Hz. Preferably, the dynamic loss tan D23_3, of the third rubber compound, measured according to standard ASTM D 5992-96, at a temperature of 23° C. at 10 Hz, is at most equal to 0.3, preferentially at most equal to 0.25, preferably at most equal to 0.2.

This drop in the dynamic loss at 23° C. is accompanied by a drop in the dynamic loss at 0° C. It is essential for the third rubber compound to have a dynamic loss tan D0_3, measured according to standard ASTM D 5992-96, at a temperature of 0° C. at 10 Hz, at most equal to 70% of the dynamic loss tan D0_1 of the first rubber compound, measured according to standard ASTM D 5992-96, at a temperature of 0° C. at 10 Hz. It is however preferable for the third rubber compound to have a sufficiently high grip performance for good linearity of the performance under extreme stresses. For that, it is preferable for the dynamic loss tan D0_3 of the third rubber compound of the tread, measured according to standard ASTM D 5992-96, at a temperature of 0° C. at 10 Hz, to be at least equal to 0.22, preferentially at least equal to 0.28.

Given the mode of operation of the axially outer parts, this drop in hysteresis must also be accompanied by a drop in the stiffness of the third material with respect to the second material and also to the first in order to facilitate flattening. Thus, it is essential for the Shore hardness DS3 of the third rubber compound to be at most equal to the Shore hardness DS1 of the first rubber compound and therefore ipso facto less than the Shore hardness DS2 of the second material of the tread and preferably at most equal to the Shore hardness DS1 of the first rubber compound minus 3. However, a difference in Shore hardness between the first and third rubber compound could sensitize these parts to microcracking of their interface and generate uneven wear. Thus, it is preferable for their two Shore hardnesses to have close values, namely it is preferable for the third rubber compound to have a Shore hardness DS3 at least equal to the Shore hardness DS1 of the first rubber compound minus 7, and in the ranges of the rubber compounds used for passenger vehicle tyres, preferentially at least equal to 45, preferentially at least equal to 50.

The axially outer parts can, just like the central part, comprise a layer of small radial thickness, less than 0.4 mm, situated between the rubber compound coating the radially outermost layer of reinforcing elements of the crown reinforcement and the radially innermost interface of the tread in order to provide the connection between these two elements.

The tread is designed so that the third rubber compound touches the ground either when new or before the tyre is completely worn. It is essential for the third material to have the ability to come into contact with the ground. Furthermore, it must be sufficiently close, in terms of mechanical properties, to the first rubber compound so that the wear of the axially outer parts of the tread is uniform with that of the central part, in particular at the interfaces between these parts. It is therefore essential for the third rubber compound to have a secant tensile modulus MA300_3 at 300% deformation, measured at 23° C. according to standard ASTM D 412-16, at least equal to 0.9 times the secant tensile modulus MA300_1 at 300% deformation of the first rubber compound. Likewise, to avoid a tendency to develop uneven wear, it is preferable for the third rubber compound to have a secant tensile modulus MA300_3 at 300% deformation, measured at 23° C. according to standard ASTM D 412-16, at least equal to 1.5 MPa, preferentially at least equal to 1.7 MPa, at most equal to 2.4 MPa, preferentially at most equal to 2.2 MPa.

To achieve these performances, a preferred solution is for the third rubber compound to comprise by weight a silica filler at most equal to 100 parts per hundred of elastomer.

The properties of the rubber compounds are measured on bonded test specimens taken from the tyre. Test specimens such as those described in standard ASTM D 5992-96 (version published in September 2006, initially approved in 1996) in Figure X2.1 (circular version) are used. The diameter "d" of the test specimen is 10 mm [0 to +0.04 mm], the thickness "L" of each of the portions of rubber compound is 2 mm [1.85-2.20].

These properties are measured on a viscosity analyser of Metravib VA4000 type on vulcanized test specimens.

The terms complex modulus, elastic modulus and viscous modulus denote dynamic properties well known to those skilled in the art. The "complex modulus" $G^*$ is defined by the following relationship: $G^* = \sqrt{(G'^2 + G''^2)}$ in which $G'$ represents the elastic modulus and $G''$ represents the viscous modulus. The phase angle $\delta$ between the force and the displacement, expressed as a dynamic loss tan $\delta$, is equal to the ratio $G''/G'$.

The response of a sample of vulcanized rubber compound subjected to a simple alternating sinusoidal shear stress at a frequency of 10 Hz with an imposed stress symmetrically about its equilibrium position is recorded. The test specimen is made to undergo accommodation prior to the temperature sweep measurement. For that purpose, the test specimen is subjected to sinusoidal shear stress loading at 10 Hz, at 100% full-scale deformation, at 23° C.

The temperature sweep measurements are taken on a temperature curve increasing by 1.5° C. per minute, from a temperature Tmin below the glass transition temperature Tg of the material up to a temperature Tmax, which may correspond to the rubber plateau of the material. Before beginning the sweep, the sample is stabilized at the temperature Tmin for 20 minutes so as to have a uniform temperature throughout the sample. The results exploited at the chosen temperature and the chosen stress are generally the dynamic complex shear modulus $G^*$, comprising an elastic part $G'$, a viscous part $G''$ and the phase angle $\delta$ between the force and the displacement, expressed as a loss factor tan D, equal to the ratio $G''/G'$. The glass transition temperature Tg is the temperature at which the dynamic loss tan D reaches a maximum during the temperature sweep.

For optimal functioning of the invention, it is preferred that the first rubber compound constitutes almost all, apart from the rubber compounds that may be necessary to ensure the conductivity of the tyre, of the radially outermost part of the tread. Thus, it is preferred that the first rubber compound constitutes at least 90% of the volume of the central part of the tread radially on the outside of the points radially on the outside of the radially outermost point of the wear indicator and spaced apart from said point of the wear indicator by a radial distance equal to 2 mm.

A preferred solution is for the second rubber compound to be present above the wear indicator so that the grip provided is effective at the end of life of the tyre, with a limit not to be exceeded of 2 mm above the wear indicator in order that the impact of the hysteresis at 23° C. of this second rubber compound on the rolling resistance remains limited. Thus, a preferred solution is that the second rubber compound makes up at least 20% of the portion of the central part of the tread, between the axial straight line passing through the radially outermost point of the wear indicator and the points that are radially on the outside of the radially outermost point of the wear indicator and situated at a radial distance equal to 2 mm from said radially outermost point of the wear indicator.

An advantageous solution for improving rolling resistance is that the bottoms of the tread pattern, the bottoms of the circumferential furrows, the bottoms of the grooves that do not contribute to the grip or the stiffness of the tread pattern elements but contribute to the performance in terms of rolling resistance, are made in the first rubber compound. Thus an advantageous solution is that, for a tyre comprising at least one circumferential furrow, the part of the tread, having a radial thickness of 0.5 mm, which is vertically in line with the bottom surface of each furrow is constituted by the first rubber compound.

A preferred solution for good resistance to attack of the crown reinforcement is that, between the bottom of the grooves of the tread pattern and the radially outermost reinforcing elements of the crown reinforcement, there is a thickness of rubber of the tread of which the radial thickness is at least equal to 1 mm. This thickness of rubber compound is mainly made of the first rubber compound of the tread. In order to optimize the rolling resistance, this thickness should be as thin as possible while at the same time allowing protection of the crown reinforcement in the event of impact, namely this thickness should be at most equal to 2.5 mm, preferably at most equal to 2 mm. This thickness is measured on a meridian section from the radially outermost points of the reinforcing elements of the radially outermost crown layer, as far as the points of the bottom surfaces of the circumferential furrows or grooves.

Thus, a preferred solution is that the radial distance between the radially innermost points of the grooves and the crown reinforcement is at least equal to 1 mm and at most equal at 2.5 mm, preferentially at most equal to 2 mm.

BRIEF DESCRIPTION OF THE FIGURES

The features and other advantages of the invention will be better understood with the aid of FIGS. 1 and 2 representing a meridian half-section of the crown of a tyre according to the invention.

DETAILED DESCRIPTION

Figure 1:
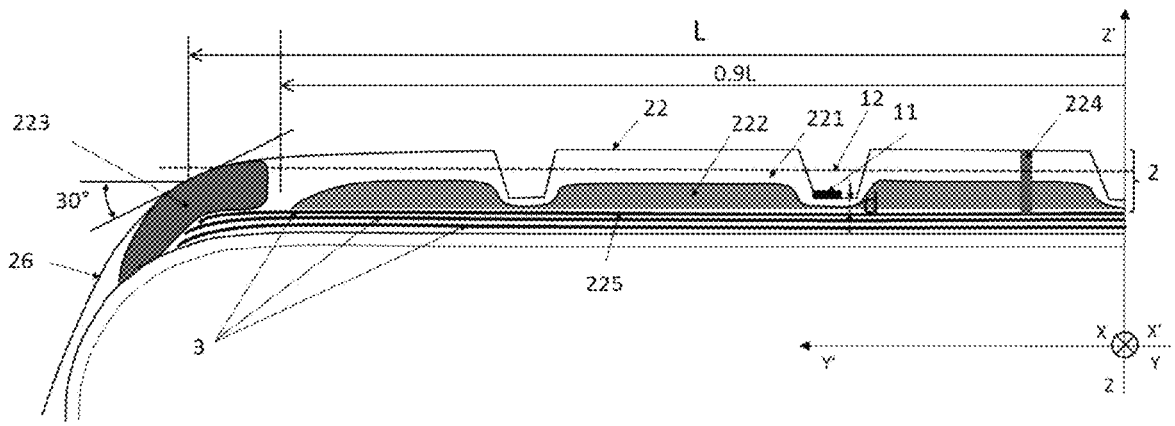

The tyre has a tread 2 intended to come into contact with the ground via a tread surface 22. The tread comprises at least three rubber compounds 221, 222, 223. The first and second rubber compounds 221, 222 make up at least 90% of the volume of the central part of the tread. The central part has an axial width equal to 90% of the axial width L of the tread. The first and third rubber compounds 221, 223 make up at least 90% of the axially outer parts of the tread.

The tread 2 may also have in the central part a part 224 of small axial width forming the link between the crown reinforcement and the tread surface so that the tyre complies with the electrical conductivity standards.

It is also possible for the tread to comprise a rubber coupling compound 225 having a radial thickness at most equal to 0.4 mm in order to ensure bonding between the crown reinforcement 3 and the tread 2.

Also shown in the figure are the wear indicator and its radially outermost point 11 and the points 12 radially on the outside of said point 11 at a radial distance of 2 mm. The part of the tread that is radially on the outside of the points 12 comprises at least 90% by volume of the first rubber compound 221, the remaining volume percentage being the conductive rubber compound 224 of small axial width and allowing the junction between the tread surface and the crown reinforcement.

The part of the tread between the straight line passing through the point 11 and the straight line formed by the points 12 comprises 40% by volume of the second rubber compound.

The tyre also comprises a crown reinforcement 3 radially on the inside of the tread 2 and comprising a plurality of layers of reinforcing elements. The two radially inner layers, shown in the figure, are two working layers, of which the reinforcing elements, which are parallel to each other in a single layer, form angles with the circumferential direction of which the absolute value is between 17 and 50°. The reinforcing elements are crossed from one layer to another. The radially outermost layer is a hooping layer, of which the reinforcing elements form an angle of between −7 and +7° with the circumferential direction.

The figures also show how to determine the tread width L. The width L of the tread is determined on a tyre mounted on a nominal rim and inflated to the nominal pressure. In the event of an obvious boundary between the tread surface and the rest of the tyre, the width of the tread is determined by those skilled in the art in a trivial manner. If the tread surface 21 is continuous with the outer lateral surface of the sidewall 26 of the tyre, the axial limit of the tread passes through the point at which the angle between the tangent to the tread surface 21 and an axial direction YY' is equal to 30°. When, in a meridian plane, there are several points for which said angle is equal to 30°, it is the radially outermost point that is adopted. The width L of the tread is equal to the axial distance between the two axial limits of the tread surface on either side of the equatorial plane.

Figure 2:
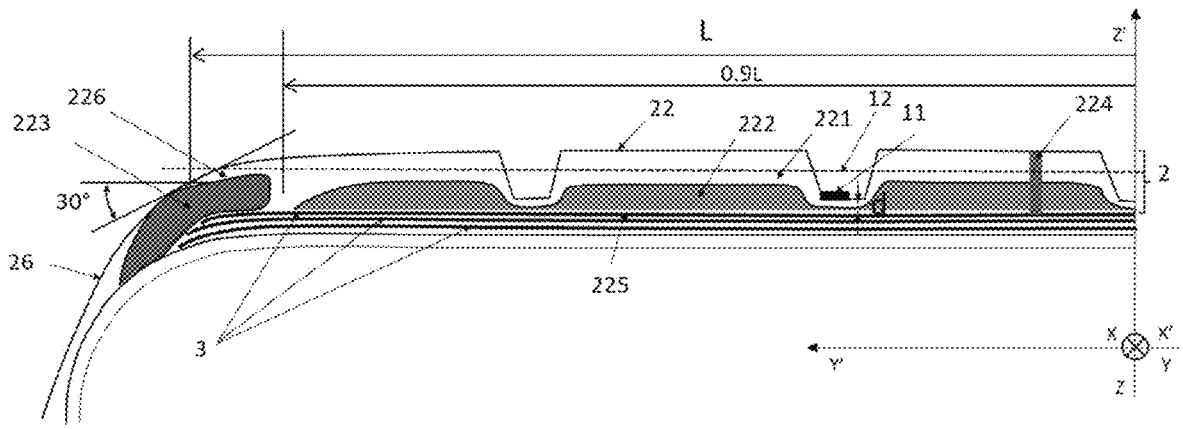

FIG. 1 shows an embodiment of the invention in which the third rubber compound 223 is axially on the outside of the first rubber compound over its radial thickness. FIG. 2 shows a variant of the invention where the third rubber compound is axially on the outside of the first rubber compound 221 but where these two rubber compounds are present on a portion 226 of the axially outer part of the tread. In this configuration, the preferred solution is for the third rubber compound to be radially on the inside of the first rubber compound as shown in FIG. 2.

The inventors carried out tests on the basis of the invention for a tyre of size 225/45 R17, with a nominal width of 225 mm.

The control tyre T of conventional design and not according to the invention comprises two rubber compounds 221 and 222. The first rubber compound is stiffer, more hysteretic and therefore more adherent but more dissipative than the second rubber compound designed with a conventional objective of reducing rolling resistance. The second rubber compound is therefore not designed to be in contact with the ground on which the tyre is running. The two rubber compounds have the following respective characteristics:

the first rubber compound has a Shore hardness DS1 equal to 64 and the Shore hardness DS2 of the first rubber compound has a Shore hardness equal to 63.5, each Shore hardness DS1, DS2 being measured at 23° C. according to standard ASTM 2240-15e1, the first rubber compound has a secant tensile modulus MA300_1 at 300% deformation, measured at 23° C. according to standard ASTM D 412-16, equal to 1.77 MPa. The secant tensile modulus MA300_2 at 300% deformation of the second rubber compound cannot be measured, it breaks before reaching the MA300 measurement conditions, because this rubber compound has a very low hysteresis and is not designed to be in contact with the ground on which the tyre is running, the second rubber compound has a dynamic loss tan D0_2, measured according to standard ASTM D 5992-96, at a temperature of 0° C. at 10 Hz, equal to 0.23 and the dynamic loss tan D0_1 of the first rubber compound, measured according to standard ASTM D 5992-96, at a temperature of 0° C. at 10 Hz, is equal to 0.69, the dynamic loss tan D23_1 of the first rubber compound, measured according to standard ASTM D 5992-96, at a temperature of 23° C. at 10 Hz, is equal to 0.38, the dynamic loss tan D23_2 of the second rubber compound, measured according to standard ASTM D 5992-96, at a temperature of 23° C. at 10 Hz, is equal to 0.15.

The tread of the tyre T is made up of 70% by volume of the first rubber compound and 30% by volume of the second rubber compound. The arrangements of the two rubber compounds are optimized according to the prior art for the tyre T, namely the parts of the tread below the radially outermost points of the wear indicators are made up of the second rubber compound over the entire width of the tread.

The invention consists in reversing this design logic by placing a rubber compound for the tread that is stiffer, has more grip, is therefore more dissipative and also has a wear performance close to that of the first rubber compound, radially on the inside of the first rubber compound and by introducing a third rubber compound into the radially outer parts of the tread. The central part of the tread is made up of 58% of the first rubber compound and 42% of the second rubber compound. The axially outer parts of the tread are made up of the third rubber compound on the tyre A1.

The three rubber compounds of the tyre A1 have the following respective characteristics:
the second rubber compound 222 has a Shore hardness DS2 equal to 64, the first rubber compound has a Shore hardness DS1 equal to 57, the third rubber compound has a Shore hardness DS3 equal to 52, each Shore hardness DS1, DS2, DS3 being measured at 23° C. according to standard ASTM 2240-15e1,
the second rubber compound 222 has a secant tensile modulus MA300_2 at 300% deformation, measured at 23° C. according to standard ASTM D 412-16, equal to 1.6 MPa, that is to say 1.07 times the secant tensile modulus MA300_1 at 300% deformation of the first rubber compound 221, equal to 1.5 MPa. The third rubber compound 223 has a secant tensile modulus MA300_3 at 300% deformation, measured at 23° C. according to standard ASTM D 412-16, equal to 1.8 MPa representing a decline in wear with respect to the first and second rubber compounds 221, 222 of between 10 and 15%,
the first and second rubber compounds 221, 222 respectively have dynamic losses tandD0_1 and tan D0_2, measured according to standard ASTM D 5992-96, at a temperature of 0° C. at 10 Hz, equal to 0.76 and the dynamic loss tan D0_3 of the third rubber compound 223 measured according to standard ASTM D 5992-96, at a temperature of 0° C. at 10 Hz, is equal to 0.29, which makes it suitable for use as a rubber compound in contact with the ground,
the dynamic loss tan D23_1 of the first rubber compound 221 is equal to 0.39, the dynamic loss tan D23_2 of the second rubber compound 222 is equal to 0.51 and the dynamic loss tan D23_3 of the third rubber compound 223 is equal to 0.13, all measured according to standard ASTM D 5992-96, at a temperature of 23° C. at 10 Hz.

The compositions of the first, second and third rubber compounds 221, 222, 223 of the tyre A1 are described with reference to Table 1 below.

TABLE 1

|  | First rubber compound 221 | Second rubber compound 222 | Third rubber compound 223 |
| --- | --- | --- | --- |
| Elastomer 1 | 100 | / | / |
| Elastomer 2 | / | 100 | / |
| Elastomer 3 | / | / | 100 |

TABLE 1-continued

|  | First rubber compound 221 | Second rubber compound 222 | Third rubber compound 223 |
| --- | --- | --- | --- |
| Carbon black | 4 | 4 | 3 |
| Silica | 110 | 150 | 60 |
| Resin | 60 | 82 | 16 |
| Antioxidant | 3.80 | 5.20 | 2 |
| Liquid silane | 8.80 | 12 | 4.8 |
| Stearic acid | 3.00 | 3.00 | 2.00 |
| DPG | 2.40 | 3.30 | 1.40 |
| ZnO | 0.90 | 0.90 | 0.80 |
| CBS | 2.30 | 2.30 | 1.70 |
| Sulfur | 1.00 | 1.00 | 1.00 |

Each elastomer 1, 2 and 3 is identical to respectively each elastomer C, D and A as described in WO2018115722. The carbon black is of N234 grade and supplied by Cabot Corporation. The silica is of HDS type and supplied by Rhodia under the reference Z1165MP. The resin is supplied by ExxonMobil Chemicals under the reference PR-383. The antioxidant is N-(1,3-dimethylbutyl)-N'-phenyl-p-phenylenediamine supplied by Flexsys. The liquid silane is supplied by Degussa under the reference TESPT Si69. DPG is diphenylguanidine supplied by Flexsys under the reference Perkacit. CBS is N-cyclohexyl-2-benzothiazole-sulfenamide supplied by Flexsys under the reference Santocure CBS.

Other compositions can of course be used by varying the contents of the various constituents of the compositions in order to obtain properties suitable for particular uses, without however departing from the scope of the invention.

It will be possible in particular to take inspiration from the compositions disclosed in WO2012069585, WO2012069565 and WO2012069567 that have a relatively high content of silica.

The tyres T and A1 have been tested for various performance aspects. Compared with the tyre T (in base 100), the tyre A1 according to the invention makes it possible to improve wet braking when new on asphalt concrete at 20° C. by +7% and wet braking at end of life, at 2 mm remaining tread pattern height, by +9%. The wet cross grip is also improved (+3.5%), the dry behaviour on the circuit is equivalent to the reference and the rolling resistance is equal to that of the control.

In the case of a tyre of the type of the invention, but where the axially outer parts are made up of the first rubber compound, the same performance is obtained but with a penalty of around 5 to 10% in rolling resistance.

The invention alone therefore makes it possible to obtain improved grip performance when new and at the end of the life of the tyre while maintaining a rolling resistance performance equal to the control.

The invention claimed is:
1. A tire for a passenger vehicle comprising:
a crown comprising a tread that is intended to come into contact with a ground via a tread surface, two beads that are intended to come into contact with a rim, and two sidewalls that connect the crown to the beads,
the tread being radially on an outside of a crown reinforcement, the crown reinforcement comprising at least one crown layer comprising reinforcing elements,
the tread having a central part and two axially outer parts, the central part having an axial width equal to 90% of an axial width L of the tread,
the tread comprising at least first, second and third rubber compounds, the central part of the tread comprising at least the first and second rubber compounds, the first and second rubber compounds making up at least 90% of a volume of the central part of the tread, in the central part of the tread, the first rubber compound being radially on an outside of the second rubber compound and the first rubber compound making up at least 40% and at most 60% of the volume of the central part of the tread, the first and third rubber compounds making up at least 90% of a volume of the axially outer parts of the tread, the third rubber compound being axially on an outside of the first rubber compound and making up at least 40% of the volume of the axially outer parts, wherein the second rubber compound has a Shore hardness DS2 at least equal to 5 plus a Shore hardness DS1 of the first rubber compound, a Shore hardness DS3 of the third rubber compound being at most equal to the Shore hardness DS1 of the first rubber compound, and each Shore hardness DS1, DS2, DS3 being measured at 23° C. according to standard ASTM 2240, wherein the second rubber compound has a secant tensile modulus at 300% deformation, measured at 23° C. according to standard ASTM D412, at least equal to 0.75 times a secant tensile modulus at 300% deformation of the first rubber compound and at most equal to 1.25 times the secant tensile modulus at 300% deformation of the first rubber compound, and the third rubber compound has a secant tensile modulus at 300% deformation, measured at 23° C. according to standard ASTM D412, at least equal to 0.9 times the secant tensile modulus at 300% deformation of the first rubber compound and at most equal to 1.3 times the secant tensile modulus at 300% deformation of the first rubber compound, wherein the second rubber compound has a dynamic loss tangent, measured according to standard ASTM D5992, at a temperature of 0° C. at 10 Hz, at least equal to a dynamic loss tangent of the first rubber compound, measured according to standard ASTM D5992, at a temperature of 0° C. at 10 Hz, and the third rubber compound has a dynamic loss tangent, measured according to standard ASTM D5992, at a temperature of 0° C. at 10 Hz, at most equal to 70% of the dynamic loss tangent of the first rubber compound, measured according to standard ASTM D5992, at a temperature of 0° C. at 10 Hz, and wherein a dynamic loss tangent of the first rubber compound, measured according to standard ASTM D5992, at a temperature of 23° C. at 10 Hz, is at most equal to a dynamic loss tangent of the second rubber compound, measured according to standard ASTM D5992, at a temperature of 23° C. at 10 Hz and a dynamic loss tangent of the third rubber compound, measured according to standard ASTM D 5992-96, at a temperature of 23° C. at 10 Hz, is at most equal to 70% of the dynamic loss tangent of the first rubber compound, measured according to standard ASTM D5992, at a temperature of 23° C. at 10 Hz.

2. The tire according to claim 1, wherein the first and second rubber compounds of the tread comprise a silica filler at least equal by weight to 100 parts per hundred of elastomer, wherein the dynamic losses tangents of the first and second rubber compounds of the tread, measured according to standard ASTM D5992, at a temperature of 0° C. at 10 Hz, are at least equal to 0.7, wherein the third rubber compound of the tread (2) comprises a silica filler at most equal by weight to 100 parts per hundred of elastomer, and wherein the dynamic loss tangent of the third rubber compound of the tread (2), measured according to standard ASTM D5992, at a temperature of 0° C. at 10 Hz, is at least equal to 0.22.

3. The tire according to claim 1, wherein the second rubber compound has a dynamic loss tangent, measured according to standard ASTM D 5992, at a temperature of 0° C. at 10 Hz, at most equal to 1.2 times the dynamic loss tangent of the first rubber compound, measured according to standard ASTM D5992, at a temperature of 0° C. at 10 Hz.

4. The tire according to claim 1, wherein the dynamic loss tangent of the first rubber compound, measured according to standard ASTM D5992, at a temperature of 23° C. at 10 Hz, is at most equal to 0.8 times the dynamic loss tangent of the second rubber compound, measured according to standard ASTM D5992, at a temperature of 23° C. at 10 Hz, and wherein the dynamic loss tangent of the third rubber compound, measured according to standard ASTM D5992, at a temperature of 23° C. at 10 Hz, is at most equal to 0.3.

5. The tire according to claim 1, wherein the secant tensile modulus at 300% deformation, measured at 23° C. according to standard ASTM D412, of the second rubber compound is at least equal to 0.9 times the secant tensile modulus at 300% deformation of the first rubber compound and at most equal to 1.1 times the secant tensile modulus at 300% deformation of the first rubber compound.

6. The tire according to claim 1, wherein the secant tensile modulus at 300% deformation, measured at 23° C. according to standard ASTM D412, of the third rubber compound is at least equal to 1.5 MPa and at most equal to 2.4 MPa.

7. The tire according to claim 1, wherein the Shore hardness DS2 of the second rubber compound is at most equal to 10 plus the Shore hardness DS1 of the first rubber compound.

8. The tire according to claim 1, wherein the Shore hardness DS3 of the third rubber compound is at most equal to the Shore hardness DS1 of the first rubber compound (221) minus 3 and at least equal to the Shore hardness DS1 of the first rubber compound minus 7.

9. The tire according to claim 1, wherein the third rubber compound of the tread is radially on the inside of the first rubber compound of the tread over a part of the tread.

10. The tire according to claim 1, wherein the third rubber compound of the tread represents at least 75% of the volume of the axially outer parts of the tread.

11. The tire according to claim 1 further comprising at least one wear indicator, wherein the first rubber compound constitutes at least 90% of the volume of the central part of the tread radially on the outside of the points radially on the outside of a radially outermost point of the wear indicator, spaced apart from the point of the wear indicator by a radial distance equal to 2 mm.

12. The tire according to claim 1 further comprising at least one wear indicator, wherein the second rubber compound makes up at least 20% by volume of the portion of the central part of the tread, between an axial straight line passing through a radially outermost point of the wear indicator and the points that are radially on the outside of the radially outermost point of the wear indicator and situated at a radial distance equal to 2 mm from the radially outermost point of the wear indicator.

13. The tire according to claim 1 further comprising at least one circumferential furrow, wherein a part of the tread, having a radial thickness of 0.5 mm, which is vertically in line with a surface of each circumferential furrow is constituted by the first rubber compound.

14. The tire according to claim 1 further comprising grooves, wherein a radial distance (d) between radially innermost points of the grooves and the crown reinforcement is at least equal to 1 mm and at most equal at 2.5 mm.

* * * * *